(12) United States Patent
Esashi et al.

(10) Patent No.: US 6,820,487 B2
(45) Date of Patent: Nov. 23, 2004

(54) REFLECTIVE MOVEABLE DIAPHRAGM UNIT AND PRESSURE SENSOR CONTAINING SAME

(75) Inventors: Masayoshi Esashi, Sendai (JP); Yoichi Haga, Sendai (JP); Takashi Katsumata, Haramachi (JP)

(73) Assignee: Masayoshi Esahi (JP)

( * ) Notice: Subject to any disclaimer, the term of this patent is extended or adjusted under 35 U.S.C. 154(b) by 40 days.

(21) Appl. No.: 10/153,884

(22) Filed: May 24, 2002

(65) Prior Publication Data
US 2002/0162399 A1 Nov. 7, 2002

Related U.S. Application Data

(63) Continuation-in-part of application No. 09/462,457, filed on Mar. 7, 2000, now abandoned.

(51) Int. Cl.[7] ................................................. G01L 9/00
(52) U.S. Cl. ......................................................... 73/705
(58) Field of Search .......................... 73/800, 705, 715, 73/756, 716, 717; 250/227.19, 227.21

(56) References Cited

U.S. PATENT DOCUMENTS

| 4,487,206 A | * | 12/1984 | Aagard ....................... 600/480 |
| 4,687,927 A | * | 8/1987 | Iwamoto et al. ........ 250/227.21 |
| 5,280,173 A | * | 1/1994 | Morse et al. .......... 250/227.23 |

FOREIGN PATENT DOCUMENTS

JP        10-111202        4/1998

* cited by examiner

Primary Examiner—Max Noori
(74) Attorney, Agent, or Firm—Parkhurst & Wendel, L.L.P.

(57) ABSTRACT

A reflective movable diaphragm unit 2 having diaphragm portions 25 formed by a circular $SiO_2$ film, a mesa portion 22 and light-reflecting mirror portion 23 of the $SiO_2$ film disposed in the center, and a ring-shaped spacer 24a and bonding layer 24b formed of metal layers in the circumferential edge portion of the diaphragm portion 25, whereby a pressure sensor is formed.

11 Claims, 7 Drawing Sheets

REFLECTIVE MOVEABLE DIAPHRAGM UNIT AND PRESSURE SENSOR CONTAINING SAME

REFERENCE TO RELATED APPLICATION

This is a continuation-in-part of application Ser. No. 09/462,457 filed Mar. 7, 2000, now abandoned.

TECHNICAL FIELD

This invention relates to a pressure sensor which permits an ultra fine element to be formed easily, and which is optimumly used to determine various kinds of pressures in the body, such as a blood pressure, etc. by incorporating the pressure sensor in a catheter and a guide wire inserted into the body, or by directly inserting the pressure sensor into a blood vessel and the like, and to form a photodetector type pressure sensor for a capillary and the like; and a method of manufacturing the same.

BACKGROUND OF THE INVENTION

A pressure sensor of related art utilizing a photodetecting principle by using an optical fiber does not utilize an electric signal, such as a piezoresistive signal, etc. Accordingly, this pressure sensor rarely receives environmental disturbance ascribed to electricity and magnetism, and has a possibility of being applied to the interior of an organism (see Japanese Patent Publication No. 3128/1990, Japanese Patent Laid-Open No. 235731/1986 and Japanese Patent Laid-Open No. 201196/1996).

The pressure sensors using an optical fiber are roughly classified as pressure sensors of the type that have a cantilever beam type silicon structure fixed to a side surface of an optical fiber with a mirror, that face an end surface of the optical fiber, fixed to a front end of the beam, and that utilize the variation of the quantity of reflected light caused by the variation of the position of the mirror due to the flexure of the beam ascribed to pressure variation, and pressure sensors of the type that have on a front end of an optical fiber a silicon structure having a total reflection mirror serving also as a movable diaphragm, and joined to a glass structure and fixed to an end surface of the optical fiber by using a bonding agent, and that measure an amount of flexure of the diaphragm as variation of the intensity of the light.

However, in a pressure sensor of the type that utilizes a side surface of an optical fiber, a side wall is tapered to form a large etching window. This arrangement causes the dimensions of a pressure sensor portion to increase, and also makes it difficult to insert the pressure sensor into a working channel of a catheter and an endoscope, and obtain a pressure sensor capable of being inserted directly into a capillary, such as a blood vessel and the like.

There are related techniques including a method, as a method of fixing a total reflection mirror serving also as a movable diaphragm to a front end of an optical fiber, of forming a fine ring-shaped bonding agent layer on a posiresist layer, which is provided on a glass plate, by exposing the posiresist layer via an Al mask, transferring the bonding agent layer onto a front end of an optical fiber, fixing the resultant layer to a diaphragm formed and held in a frame of a silicon substrate via a holding portion, and cutting off the holding portion with a laser beam. However, in this method, the efficiency of transferring the bonding agent layer onto the front end of the optical fiber is low, and much time and labor is required to separate the diaphragm from the silicon substrate by cutting off the holding portion with a laser beam. Therefore, this method is inferior in the manufacturing efficiency of a pressure sensor and the yield thereof.

The present invention has been devised so as to eliminate the drawbacks, such as a low yield on the manufacturing of a pressure sensor portion, or a low yield on the connecting of a pressure sensor and an optical fiber together which are encountered in an optical fiber type pressure sensor of related art capable of being used in the interior of an organism such as a blood vessel, etc. and a capillary.

DISCLOSURE OF THE INVENTION

The present invention provides a pressure sensor wherein a reflective type movable diaphragm unit that has a mesa portion of a circular, thick $SiO_2$ film, and a light reflecting mirror portion formed of a thin Al film in the center of a diaphragm portion formed of a circular, thin $SiO_2$ film, and that has a ring-shaped spacer serving also as a bonding agent layer at a circumferential edge section of the diaphragm portion, is fixed in a sealed state to a front end, which has a half mirror layer thereon, of an optical fiber of not larger than 125 μm in diameter, the diaphragm portion having a cross-sectionally substantially semicircular part.

The present invention further provides a method of manufacturing pressure sensors, the method including a step of accumulating $SiO_2$ layers on a front surface of a silicon substrate and forming mesa portions by circularly leaving the $SiO_2$ layers, a step of accumulating on a rear surface of the silicon substrate $SiO_2$ layers as masks for separating reflective type movable diaphragms from the silicon substrate, a step of forming diaphragm portions by further accumulating $SiO_2$ layers on the front surface of the silicon substrate, a step of forming light reflecting mirror portions by accumulating Al layers on the mesa portions, a step of forming around the diaphragm portions spacers serving also as adhesive layers and comprising polyimide, a step of separating the reflective type movable diaphragm units from the silicon substrate, a step of forming half mirror layers on front ends of optical fibers, a step of fixing the reflective type movable diaphragm units to the front ends of the optical fibers by inserting the reflective type movable diaphragm units into capillaries so that the end surfaces of the diaphragm units and those of the optical fibers are opposed to each other, bringing the reflective type movable diaphragm units and optical fibers into close contact with each other by microbeads and other optical fibers inserted from the other ends of the capillaries, and turning the polyimide layers into bonding agents by heating the diaphragm units, and a step of withdrawing the optical fibers from the capillaries, the step of forming the diaphragm portions including a step of accumulating $SiO_2$ layers in annular grooves provided in the front surface of the silicon substrate and thereby forming cross-sectionally substantially semicircular parts.

The present invention still further provides a method of manufacturing pressure sensors, by forming a reflective type movable diaphragm unit and optical fibers by using the above-mentioned initial step to the step of forming half mirror layers; inserting the above-mentioned movable diaphragm units into capillaries so that the end surfaces of the diaphragm units and those of the optical fibers are opposed to each other; bringing the reflective type movable diaphragm units and optical fibers into close contact with each other by microbeads and other optical fibers inserted from the other ends of the capillaries; turning the polyimide layers into bonding agents by heating the diaphragm units, whereby the reflective type movable diaphragm units are fixed to the front ends of the optical fibers.

MODE FOR CARRYING OUT THE INVENTION

Figure 1:
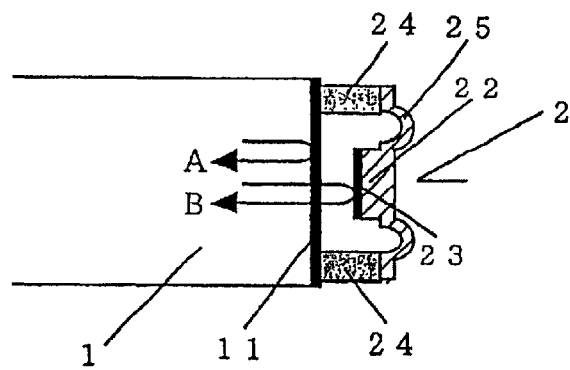
FIG. 1 is a sectional view of an example of a pressure sensor.

In the pressure sensor according to the present invention, a reflective type movable diaphragm unit having a mesa portion of a thick $SiO_2$ film and a light reflecting mirror portion of a thin Al film in the center of a corrugated type diaphragm portion formed of a circular, thin film of $SiO_2$, and a spacer serving also as an adhesive layer and comprising a thick film of polyimide at a circumferential edge section of the diaphragm portion is fixed in a sealed state to a front end, which has a half mirror layer of ZnS, of an optical fiber of not larger than 125 µm in diameter. An example of this pressure sensor is shown in FIG. 1. A reference numeral 1 denotes an optical fiber, 11 a ZnS layer (half mirror layer) thereof, 2 a reflective type movable diaphragm unit, 25 a $SiO_2$ layer (corrugated type diaphragm portion) thereof, 22 a $SiO_2$ layer (mesa portion) thereof, 23 an Al layer (light reflecting mirror portion) thereof, and 24 a polyimide layer (spacer serving also as an adhesive layer) thereof.

The manufacturing of the reflective type movable diaphragm unit of this pressure sensor can be done, for example, by the following method. Namely, the reflective type movable diaphragm unit of the pressure sensor can be manufactured as shown in the examples of steps in FIGS. 2a to 2h, by a step (a, b) of forming mesa portions 22 by digging annular grooves 26 for corrugated diaphragm portions in a front surface of a silicon substrate 3, accumulating $SiO_2$ layers on central circular portions defined by the grooves 26, and leaving the $SiO_2$ layers circularly, a step (a, b) of accumulating on a rear surface of the silicon substrate 3 $SiO_2$ layers as masks 31 for separating reflective type movable diaphragm units 2 individually from the silicon substrate 3, a step (c, d) of forming corrugated type diaphragm portions 25 by further accumulating $SiO_2$ layers on the front surface of the silicon substrate 3 including the grooves 26, a step (e, f) of forming light reflecting mirror portions 23 by accumulating Al films on the mesa portions 22, a step (e, f) of forming spacers serving also as adhesive layers 24 by comprising polyimide on circumferential edge sections of the corrugated type diaphragm portions 25, and a step (g, h) of separating the reflective type movable diaphragm units 2 from the silicon substrate 3.

Figure 2:
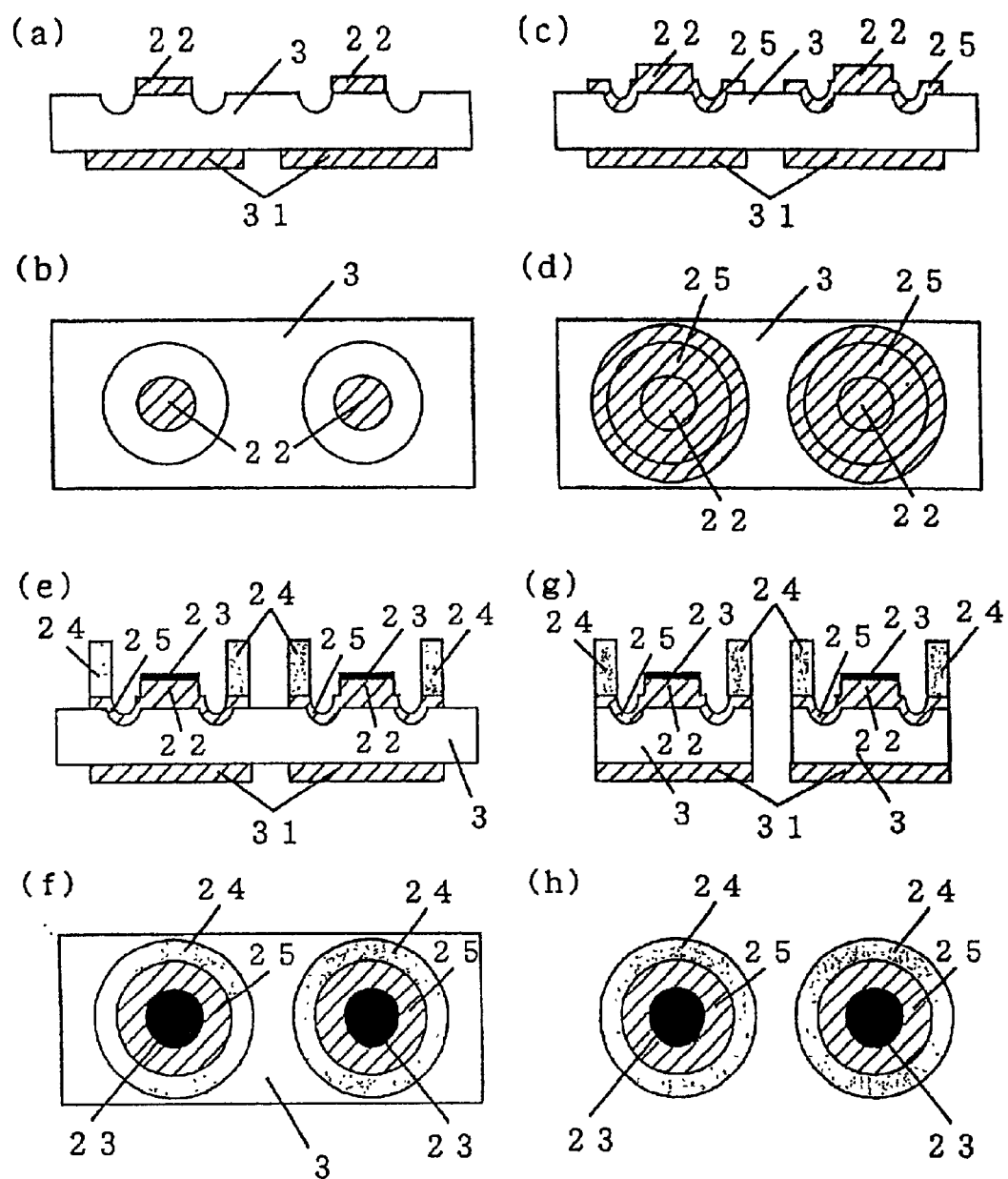
FIGS. 2a to 2h are explanatory drawings showing examples of steps of manufacturing reflective type movable diaphragm units.

The manufacturing steps illustrated in FIG. 2 are the manufacturing steps used in a case where a plurality of reflective type movable diaphragm units is formed on one silicon substrater and then separated therefrom. Accordingly, a plurality of reflective type movable diaphragm units can be formed at once by using a silicon substrate of a large area, and, moreover, the manufacturing steps themselves are simple. Therefore, the through-put and yield become high, and a production efficiency can be improved easily.

The bonding of an optical fiber 6 of not larger than 125 µm in diameter having a half mirror layer of ZnS at a front end thereof to a front end of a reflective type movable diaphragm unit manufactured by the steps of FIG. 2 can be done, for example, by the following method. Namely, as shown the examples of steps in FIGS. 3a to 3d, the method includes a step (a) of inserting the above-mentioned reflective type movable diaphragm unit 2 and an optical fiber 1 of not larger than 125 µm in diameter having a half mirror layer of ZnS at a front end thereof into a capillary 4 so that the ends thereof are opposed to each other, and inserting a microbead 5 and another optical fiber 6 for a bonding purpose from the other end of the capillary thereinto, a step (b) of bringing the reflective type movable diaphragm unit 2 and optical fiber 1 into close contact with each other by the microbead 5 and bonding optical fiber 6, and heating the diaphragm unit, a step (c) of fixing in a sealed state the diaphragm unit to the optical fiber 1 with a polyimide layer 24 turned into an adhesive layer by the heating operation, and a step (d) of removing the silicon substrate 3 by etching the same.

Referring to FIG. 2, the thickness of the silicon substrate 3 in use is suitably determined in the step of bonding the reflective type movable diaphragm unit 2 and optical fiber 1 together. When the silicon substrate is too thin, the handling thereof with respect to the capillary 4 becomes difficult, and, when it is too thick, it is tapered in the step of separating the reflective type movable diaphragm unit 2 therefrom, so that the diaphragm unit cannot be inserted into the capillary 4. A not greater than 5 mm silicon substrate is used generally, a not greater than 1 mm silicon substrate particularly, and a 0.1 to 0.5 mm silicon substrate more particularly.

A both-side polished silicon substrate is used to carry out photolithography on both surfaces thereof. Although a surface direction is not specially limited when the silicon substrate is removed by a dry etching method based on a micromachining system directed to the formation of a semiconductor circuit, it is suitably determined when wet etching is carried out. In general, a surface direction of (100) or (110) is used.

Referring to FIGS. 2a and 2b, the annular grooves 26, which are dug in the front surface of the silicon substrate 3, for the corrugated type diaphragm portions determine the shape of the diaphragm portions 25, and the shape of the grooves 26 can be determined suitably in accordance with the residual stress on and the pressure deformability of the corrugated type diaphragm portions 25. The depth of the annular grooves 26 is 2 to 6 µm, and preferably 5 µm, the width thereof 8 to 12 µm, and preferably 10 µm, and the diameter thereof 71 to 79 µm, and preferably 75 µm.

The $SiO_2$ layers provided on the front surface of the silicon substrate 3 are to form mesa portions 22 of the reflective type movable diaphragm units 2, and the thickness of the layers can be determined suitably in accordance with the functionr etc. of the mesa portions of preventing the light reflecting mirror portions 23 comprising Al layers from being bent when the diaphtagms are deformed. This thickness is set to not larger than 15 μm generally, not larger than 10 μm particularly, and 2 to 5 μm more particularly.

Accordingly, a method of forming the mesa portions 22 by circularly leaving the $SiO_2$ layers on the front surface of the substrate can be carried out by additionally providing a $SiO_2$ layer by a suitable system, such as a CVD system and the like, and removing (a, b) an unnecessary part of the $SiO_2$ layer by a micromachining system and the like directed to the formation of a semiconductor circuit in which the $SiO_2$ layer is subjected to patterning and etching based on photolithography, whereby the $SiO_2$ layers 22 are circularly left.

Referring further to FIGS. 2a and 2b, in order that the $SiO_2$ layers provided on the rear surface of the silicon substrate 3 are used as masks 31 for an etching operation for separating the reflective type movable diaphragm units 2 from the silicon substrate 3, the thickness of the same layers can be determined suitably in accordance with the etching selectivities of the $SiO_2$ and silicon. This thickness is set to not larger than 2 μm generally, not larger than 1 μm particularly, and 0.5 to 1 μm more particularly.

Therefore, forming the masks 31 for an etching operation by circularly leaving the $SiO_2$ layers on the rear surface of the substrate can be carried out by a method identical with that used for forming mesa portions 22 on the front surface of the silicon.

As shown in FIGS. 2c and 2d, the circular corrugated type diaphragm portions 25 comprising $SiO_2$ on the silicon substrate constitute substantial movable portions. Therefore, the formation of the diaphragm portions 25 can be suitably determined in accordance with the pressure deformability, etc. of the diaphragm portions 21 with respect to the residual stress at the time of forming the $SiO_2$ layers. The diaphragm portions can be formed easily, for example, by thermal CVD, plasma CVD using as a material TEOS the residual stress of which can be controlled, etc.

The thickness of the circular corrugated type diaphragm portions 25 comprising $SiO_2$ layers can be determined suitably in accordance with the pressure deformability of the diaphragm portions working as diaphragms. This thickness is set to not larger than 5 μm generally, not larger than 2 μm particularly, and 0.5 to 1 μm more particularly.

As shown in FIGS. 2e and 2f, the formation of the light reflecting mirror portions 23 comprising Al layers can be carried out by removing unnecessary portions of the Al layers, which are provided additionally by a suitable system, such as vapor deposition, etc., by a micrcmachining system directed to the formation of semiconductor circuit in which patterning and lift-off by photolithography are carried out, and thereby circularly leaving the Al layers. The formation of the light reflecting mirror portions 23 can also be carried out by providing Al layers additionally by a suitable system, such as vapor deposition, etc., and etching the unnecessary portions of the Al layers by utilizing a photolithographic system. The thickness of the Al layers 23 can be determined suitably in accordance with the necessity of the Al layers of functioning as total reflection mirrors. This thickness is set to not smaller than 0.2 μm generally, 0.2 to 1 μm particularly, and 0.2 to 0.5 μm more particularly.

Referring to FIGS. 2e and 2f, the formation of the spacers serving also as adhesive layers 24 and comprising polyimide which extend around the corrugated type diaphragm portions 21 is carried out by patterning the polyimide in the same manner as in a micromachining system directed to the formation of a semiconductor circuit in which the patterning of regular photoresist is done. The conditions for a curing operation carried out after the patterning of the polyimide can be determined suitably due to the necessity of utilizing the polyamide as an adhesive layer for the bonding of optical fiber 1. The curing operation is carried out at not higher than 250° C. for within 1 hour generally, at 100° C. to 200° C. for within 30 minutes particularly, and at 120° C. to 180° C. for 10 to 30 minutes more particularly.

The thickness of the polyimide layers 24 can be determined suitably in accordance with the interference conditions of the light A reflected on the half mirror layer 11 and that B reflected on the light reflecting mirror portion 23. This thickness is set to not larger than 50 μm generally, not larger than 10 μm particularly, and 2 to 5 μm more particularly.

As shown in FIGS. 2g and 2h, the separation of the reflective type movable diaphragm unit 2 from the silicon substrate 3 can be carried out by a suitable method, such as etching and the like. Limitations are not specially placed on the etching method as long as proper portions only of the silicon substrate 3 are removed thereby with each constituent element of the reflective type movable diaphragm unit 2 not removed. In general, the separation operation is carried out by dry etching.

Figure 3:
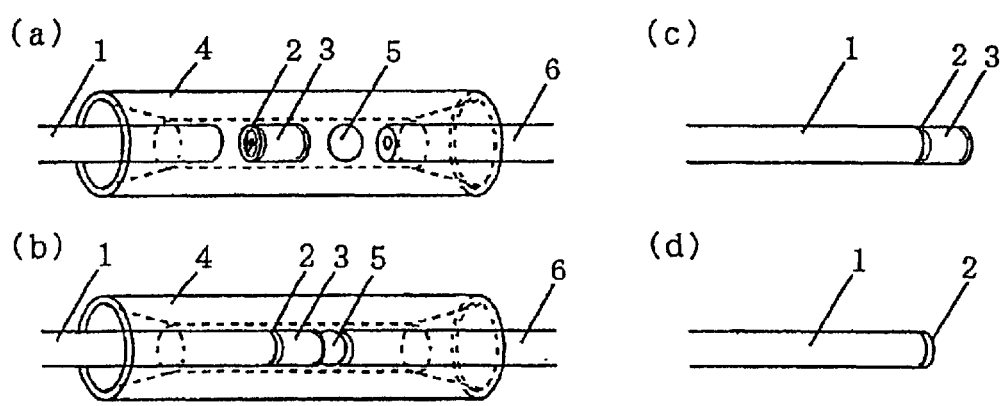
FIGS. 3a to 3d are explanatory drawings showing an example of a process for bonding a reflective type diaphragm unit and an optical fiber to each other.

Referring to FIG. 3, the optical fiber 1 is obtained by forming the half mirror layer 11 on the end surface thereof, which is formed by processing the fiber so that the flat fiber has a flat surface perpendicular to the lengthwise direction thereof. How to form the half mirror layer 11 is determined suitably in accordance with the necessary conditions for setting the intensity and visibility of reflected light to high levels. For example, a layer of ZnS, etc. having a high refractive index, and a satisfactory reflectance in view of the single layer structure is formed by vapor deposition. The thickness of the layer used is not larger than 200 nm generally, not larger than 100 nm particularly, and 50 to 100 nm more particularly. The meterial suitable may use plastics or glass or the like.

The thickness and shape of the optical layer are not specially limited, i.e., an optical fiber of a suitable thickness and shape can be used. When the optical fiber is used for a pressure sensor having a superior thinness, especially, a pressure sensor applied to the interior of an organism, such as a blood vessel and the like and a capillary and the like, the diameter thereof is set to not larger than 250 μm generally, not larger than 200 μm particularly, and 100 to 150 μm more particularly.

The inner diameter of the capillary 4 in FIG. 3a can be determined suitably depending upon the outer diameters of the optical fiber 1 and reflective type movable diaphragm unit 2 which are to be bonded together. The inner diameter of the capillary 4 is not specially limited as long as it permits the combining of the optical fiber 1 and reflective type movable diaphragm unit 2 with each other to be done. The outer diameter of the capillary is not specially limited either. In addition, the material for the capillary 4 is not specially limited as long as the optical fiber 1 and reflective type movable diaphragm unit 2 can be brought into close contact with each other therein and heated. For example, glass and the like can be used.

Furthermore, regarding the microbead 5 and optical fiber 6 to be bonded, the materials therefor and the sizes thereof are not specially limited as long as the optical fiber 1 and reflective type movable diaphragm unit 2 can be brought into close contact with each other and heated. For example, glass and the like can be used to form the microbead 5. A stainless steel wire can be substituted for the optical fiber 6 to be bonded.

The shape of the microbead 5 is not specially limited as long as the spacer serving also as an adhesive layer 24 of the reflective type movable diaphragm unit 2 can adhere uniformly to the end surface of the optical fiber 1. For example, the microbead 5 is made spherical, and the microbead 5 and reflective type movable diaphragm unit 2 are brought into point contact with each other. This arrangement enables the end surface of the spacer serving also as an adhesive layer 24 and that of the optical fiber 1 to be stuck uniformly to each other even when the end surface of the optical fiber 6 to be bonded and that of the optical fiber 1 are not parallel to each other.

The bonding of the optical fiber 1 and reflective type movable diaphragm unit 2 to each other as shown in FIG. 3b is done by inserting the optical fiber 1 and reflective type movable diaphragm unit 2 into the capillary so that the end surface having the half mirror layer 11 of the former and that having the spacer serving also as an adhesive layer 24 of the latter are opposed to each other, bringing these end surfaces into close contact with each other by the microbead 5 inserted from the other end of the capillary, and heating the diaphragm unit. The adhesion of the reflective-type movable diaphragm unit may be at such a level that permits the diaphragm unit 2 to be fixed after it is heated to the optical fiber 1, and is not specially limited. The heating conditions can be determined suitably depending upon the conditions for giving adhesiveness to the spacer serving also as an adhesive layer and comprising polyamide. The heating operation is carried out at 300° C. to 500° C. for within 2 hours generally, at 300° C. to 450° C. for within 1 hour particularly, and at 300° C. to 400° C. for 20 to 40 minutes more particularly.

As shown in FIGS. 3c and 3d, the unnecessary silicon 3 on the rear surface of the reflective type movable diaphragm unit 2 can be removed by a suitable method, such as an etching method and the like. Regarding the etching method, special limitations are not placed thereon as long as it permits the unnecessary silicon substrate 3 alone to be removed with each constituent element of the optical fiber 1 and reflective type movable diaphragm unit 2 not removed thereby. In general, dry etching is carried out.

The hollow space between the half mirror layer 11 and light reflecting mirror portion 23 can be formed as an atmospheric pressure atmosphere, a depressurized atmosphere or a hot atmosphere of a suitable gas, such as argon, nitrogen, air, etc. The controlling of the pressure in the hollow space can be done by a system for tightly sealing a depressurized atmosphere and a pressurized atmosphere, whereby an absolute pressure measuring pressure sensor utilizing a vacuum in the space and a high pressure measuring pressure sensor utilizing a high pressure in the small-diameter space can be obtained.

The pressure sensor according to the present invention utilizes the interference of light A reflected on the half mirror layer 11 and light B reflected on the light reflecting mirror portion 23 with each other, and is placed in a pressure atmosphere to be measured, whereby the diaphragm portion 21 is deformed in accordance with the pressure to cause a phase shift to occur between the reflected light A, B, interference light on which the phase shift is reflected being formed, a pressure being detected owing to the properties of the interference light. Namely, a pressure can be detected on the basis of the correlation between the variation of an optical distance due to the displacement of the diaphragm portion 21 based on the pressure of an object to be measured and the phases of the reflected light, or the quantity of the reflected light.

The pressure sensor according to the present invention is shaped so that it can be suitably used to measure the pressure in an organism, such as a blood vessel and the like, a capillary, or other narrow parts. The pressure sensor can be manufactured at a high yield, and the connecting of the reflective type movable diaphragm unit 2 and optical fiber 1 together can be done efficiently.

Figure 4:
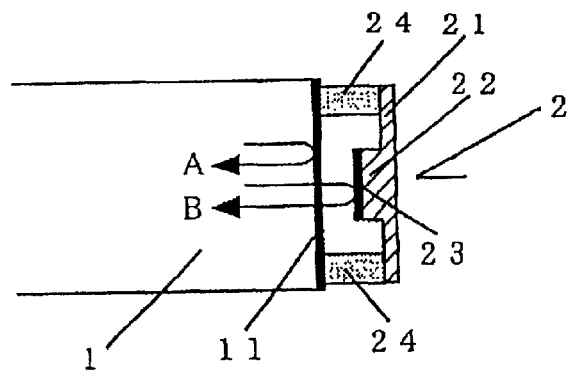
FIG. 4 is a sectional view of another example of a pressure sensor.

In the example shown in FIG. 4, a reference numeral 1 denotes an optical fiber, 11 a ZnS layer (half mirror layer) thereof, 2 a reflective type movable diaphragm unit, 21 a SiO$_2$ layer (diaphragm portion) thereof, 22 a SiO$_2$ layer (mesa portion) thereof, 23 an Al layer (light reflecting mirror portion) thereof, and 24 a polyimide layer (spacer serving also as an adhesive layer) thereof. The example shown in FIG. 4 is different in construction of diaphragm portion 21 from that shown in FIG. 1. The example of FIG. 4 has a diaphragm portion of a flat shape, the manufacturing of which may be done in accordance with that of the diaphragm portion of FIG. 1.

Although the discussion above is directed to pressure sensors where spacers and adhesive layers were formed from polyimide, the present invention is not so limited. The diaphragm unit 2 illustrated in FIG. 5 differs from the diaphragm units 2 illustrated in FIGS. 1 and 4. In the diaphragm unit 2 illustrated in FIG. 5, a spacer 24a is formed of a metal layer made from electroplating. In order to bond spacer 24a to an optical fiber 1, a solder layer is employed to bond layers 24b and 24c rather than the above-mentioned adhesive layer. No explanations will be provided for figure numberings that have already been used in the explanation above.

Similar to the spacer 24, spacer 24a is a ring-shaped one around the circumferential edge portion of the diaphragm portion 25. Moreover, spacer 24a is formed in such a way that the thickness becomes approximately 4μ in a material such as nickel (Ni).

The bonding layer 24b is formed, for example, of an Au/Sn layer on top of spacer 24a of diaphragm unit 2. The bonding layer 24c is formed, for example, on top of the end surface of the optical fiber 1, from the diaphragm portion side, facing the optical fiber side, in layers of Au, Cu, and Cr (sequentially in that order). In bonding layers such as 24b and 24c, alloy layers are made from Sn+Au, Cu, and Cr, and result in bonding of the diaphragm unit 2 to the optical fiber 1. Au is used to prevent the oxidization of Sn.

A description of how the spacer 24a and the bonding layer 24b are to be comprised is now provided directed to FIGS. 6(a) to 6(g).

First, in order to form the circumferential edge portion and mesa portions 22 of the diaphragm unit 2, following the TEOS (tetraethoxysilane: Si(OC$_2$H$_5$)$_4$) CVD method, SiO$_2$ is deposited on top of the heated silicon (Si) substrate 3, and then patterned (FIG. 6(a)). The SiO$_2$ layer formed on the backside of silicon substrate 3 is an etching mask to separate diaphragm unit 2 from silicon substrate 3. Then, in order to form a flat model of diaphragm unit 2, SiO$_2$ (700 Å) is deposited, for example, following the CVD method (FIG. 6(b)). Next, as the bottom layer for spacer 24a, Cr (500 Å) and then Au (1000 Å) undergoes sputtering, and then patterning in the shape of spacers (FIG. 6(c)).

Next, in order to form light reflecting mirror portion 23, Al undergoes evaporation and patterning. Then, in order to form spacer 24a and bonding layer 24b by an electroplating method, photoresist patterning is performed leaving the circumferential edge portion of diaphragm portion 25, and Au/Sn/Ni is attached to the circumferential using the edge portion of diaphragm portion 25 by electroplating (FIG. 6(e)). Then, from the rear surface of silicon substrate 3, Si undergoes reactive ion etching and diaphragm unit 2 is separated (FIG. 6(f)). Next, diaphragm unit 2, formed in this way, is bonded with optical fiber 1 inside a capillary in the same method previously explained with respect to FIG. 3 (FIG. 6(g)). Bonding of the diaphragm unit 2 and optical fiber 1 is carried out in a vacuum. By performing this operation in a vacuum, cavity 29 is vacuum sealed.

An explanation of the formation of half mirror layer 11 and bonding layer 24c on the end surface of optical fiber 1 is provided directed to FIGS. 7(a) to 7(i).

Figure 7A:
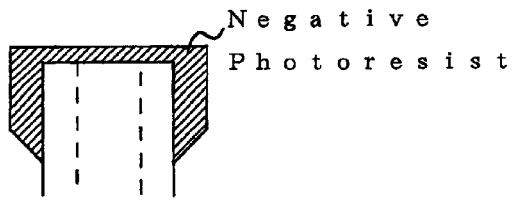
FIGS. 7(a) to 7(i) are explanatory drawings showing the method of formation of the half mirror and a bonding layer in the pressure sensor of FIG. 5.
Figure 7F:
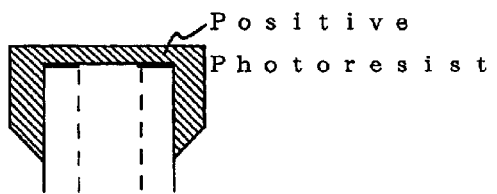
Figure 7B:
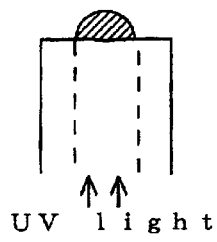
Figure 7G:
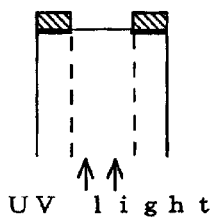
Figure 7C:
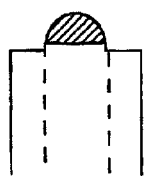
Figure 7H:
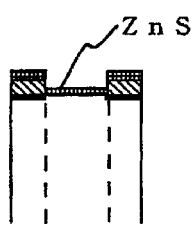
Figure 7D:
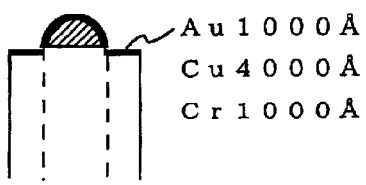
Figure 7I:
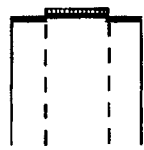
Figure 7E:
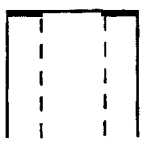

The end surface of the optical fiber 1 is treated with a negative photoresist coating (FIG. 7(a)), and the core area of the optical fiber 1 is developed after exposure to UV light that is propagated from the other end surface of the optical fiber 1 (FIG. 7(b)), leaving a resist in the core area. Then, the $SiO_2$ on the clad portion undergoes etching by being dipped/soaked in an etching solution (FIG. 7(c)), Au/Cu/Cr is evaporated (FIG. 7(d)), and the photoresist is removed, resulting in the formation of bonding layer 24c (FIG. 7(e)). Next, the end surface of the optical fiber 1 undergoes positive photoresist coating, and the core area of the optical fiber 1 is developed after exposure to UV light that is propagated from the other end surface of the optical fiber 1 (FIG. 7(f)), leaving a resist in the clad portion (FIG. 7(g)). Then, ZnS is evaporated (FIG. 7(h)), and finally, the photoresist is removed, forming a half mirror layer 11 only in the core area (FIG. 7(i)).

An alternative method of forming a half mirror layer 11 and bonding layer 24c at the end surface of the optical fiber 1 is shown in FIGS. 8(a) to (f).

Figure 8:
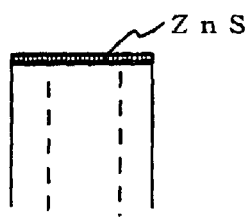
FIGS. 8(a) to 8(f) are explanatory drawings showing the method of formation of the half mirror and another bonding layer in the pressure sensor of FIG. 5.
Figure 8:
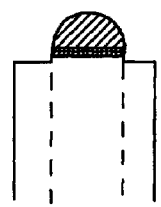
Figure 8:
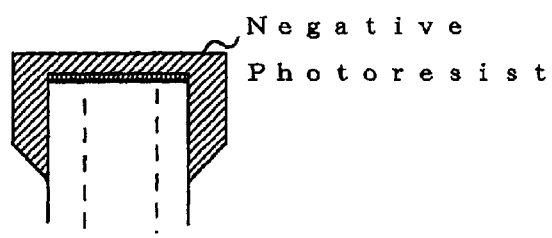
Figure 8:
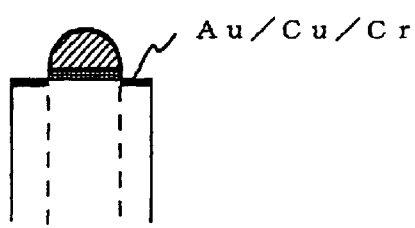
Figure 8:
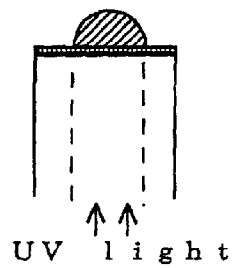
Figure 8:
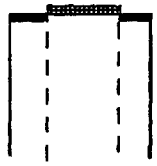

The ZnS on the end surface of the optical fiber 1 is evaporated (FIG. 8(a)), and then it is treated with negative photoresist coating (FIG. 8(b)); the core area of the optical fiber 1 is developed after exposure to UV light that is propagated from the other end surface of the optical fiber 1 (FIG. 8(c)), leaving a resist in the core area. Then, the ZnS and $SiO_2$ on the clad portion undergo etching by being dipped/soaked in an etching solution (FIG. 8(d)). Au/Cu/Cr is evaporated, forming bonding layer 24c (FIG. 8(e). Finally, the photoresist is removed, forming a half mirror layer 11 in only the core area (FIG. 8(f)).

In this way, bonding layer 24c and half mirror layer 11 are formed on the end surface of the optical fiber 1. By melting down bonding layer 24c formed on the end surface of optical fiber 1 with bonding layer 24b (see FIG. 6(e)), diaphragm 2 is bonded to optical fiber 1.

In a pressure sensor made in this way, because spacer 24a is made of metal layers, the quantity of gas passing by spacer 24a is much smaller compared with using a spacer 24 made from epoxy resin; the use of metal layers helps maintain cavity 29 as a vacuum. When there is gas inside the cavity, the pressure sensor also reacts to (is affected by) heat expansion of gas inside cavity 29 in addition to pressure within the area to be measured. Because this pressure sensor is free of gas, the sensor can measure pressure to a higher degree of accuracy.

The explanation above involves cases where half mirror layer 11 is formed from ZnS, and the light reflecting mirror portion 23 is formed from Al; however, this invention is not limited to these particular embodiments. For example, the light reflecting mirror portion 23 can be formed from Al and the half mirror layer 11 can be formed from Cr. Also, the light reflecting mirror portion 23 and half mirror layer 11 can both be formed from ZnS.

Figure 9:
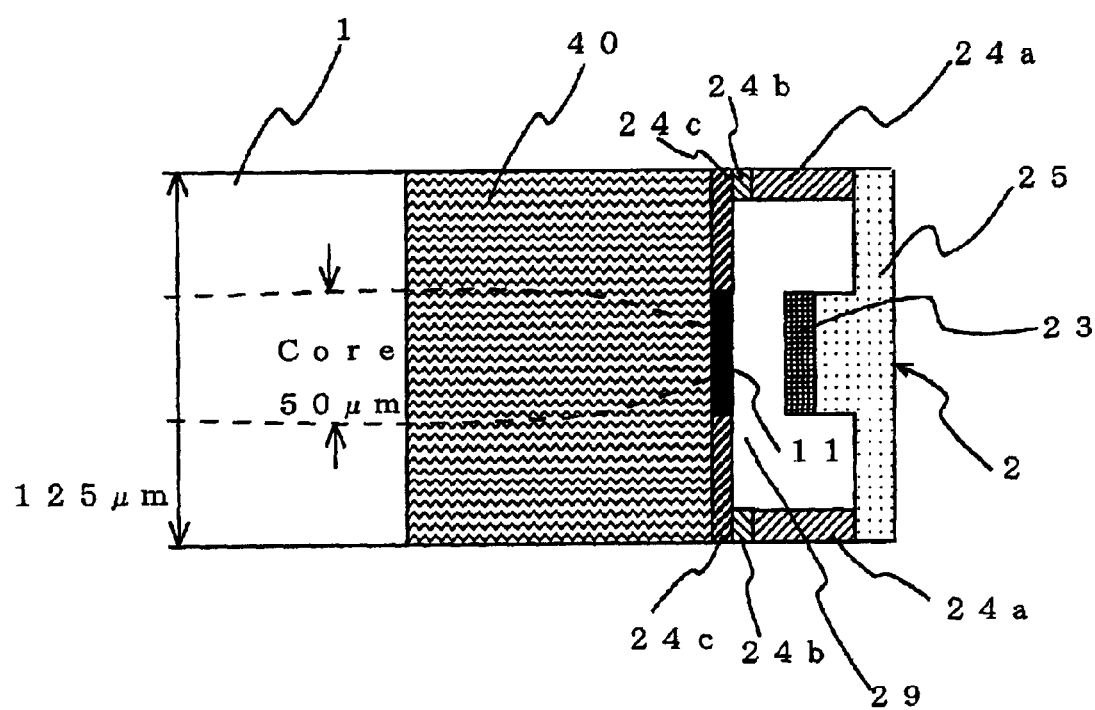
FIG. 9 is a sectional view of yet another pressure sensor embodiment of the present invention.

FIG. 9 shows a pressure sensor of yet another alternative embodiment of this invention. Compared to pressure sensors in FIGS. 1 and 4, the pressure sensor in FIG. 9 has a rod lens 40 placed between half mirror 11 and optical fiber 1.

Rod lens 40 is formed in a cylinder shape having the same diameter as optical fiber 1, and is an optical glass that is distributed so that the refractive index declines in the radial shape from the center axis towards the perimeter.

By using rod lens 40, light emitted from the end surface of optical fiber 1 can be directed efficiently towards mirror portion 23 of diaphragm unit 2. Also, the reflection from mirror portion 23 can be efficiently directed into the end surface of optical fiber 1.

Figure 5:
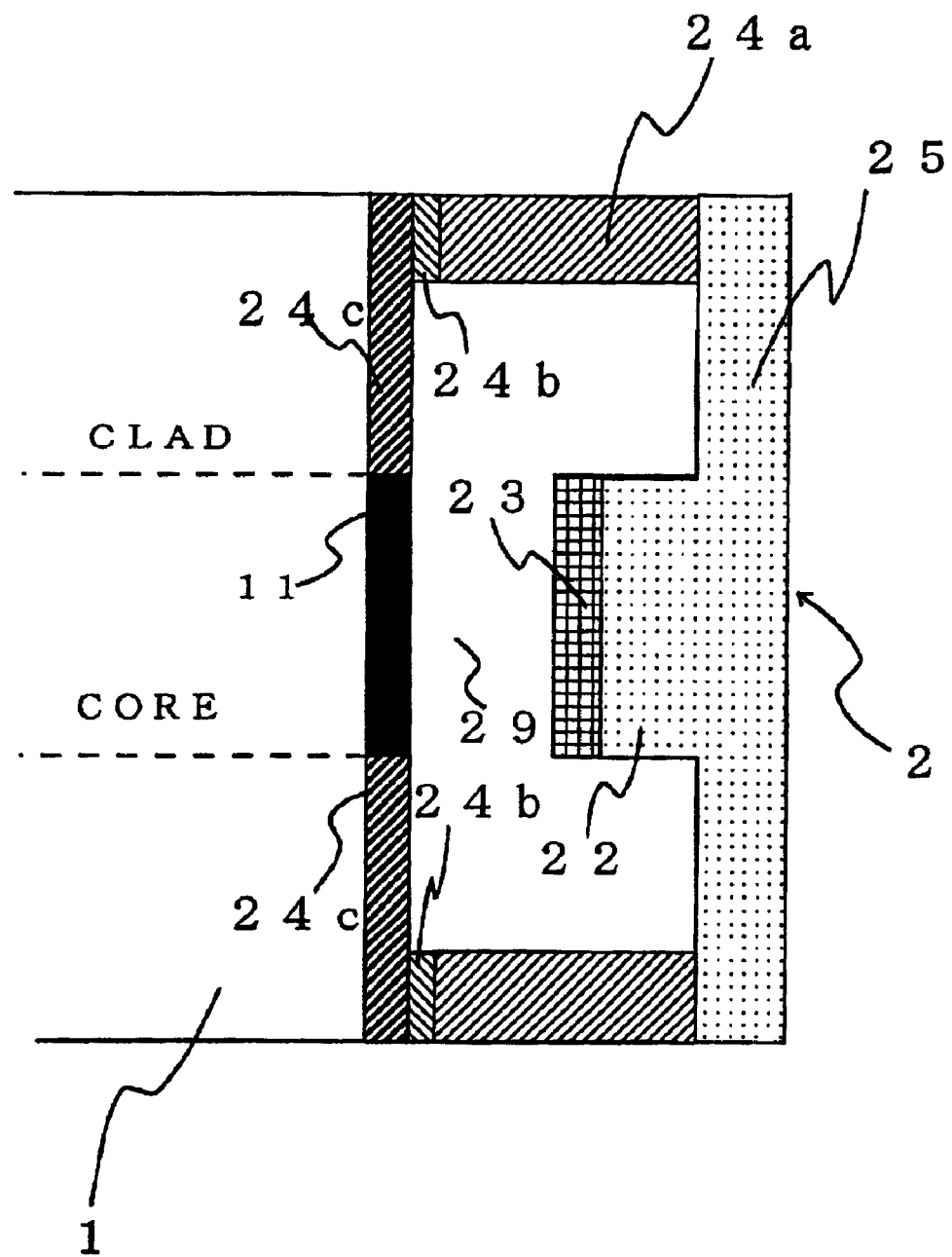
FIG. 5 is a sectional view of another pressure sensor embodiment of the present invention.
Figure 6:
FIGS. 6(a) to 6(g) are explanatory drawings showing the manufacturing process for the diaghragm unit shown in FIG. 5.
Figure 6:
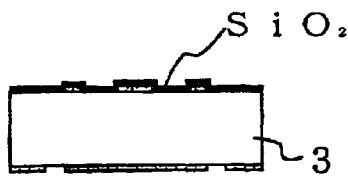
Figure 6:
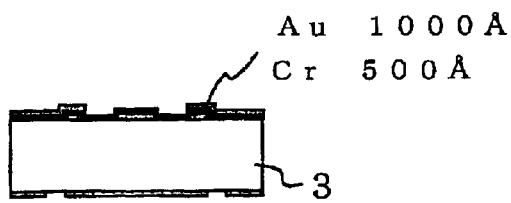
Figure 6:
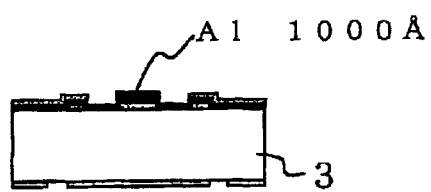
Figure 6:
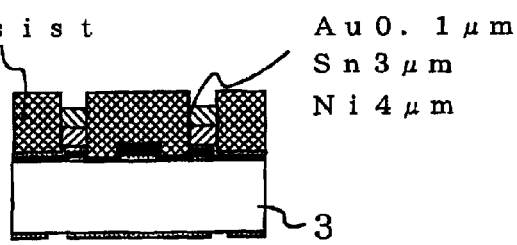
Figure 6:
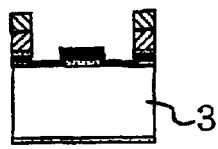
Figure 6:
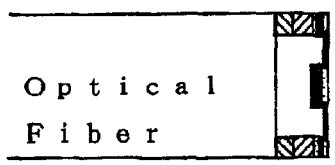

FIGS. 5 and 9 above show cases where diaphragm unit 2 was formed as a flat type. However, diaphragm unit 2 can also be formed as a corrugated type.

The illustration above exemplifies the case where the inside of the cavity 29 is vacuum-sealed. However, a pressure sensor indicated by FIG. 5 or FIG. 9 may be formed wherein the inside of the cavity 29 is not vacuum-sealed.

While the description above is directed to an embodiment where bonding layers 24b and 24c shown in FIGS. 5 and 9 are formed of metal layers, it is also possible for at least either one of bonding layer 24b or 24c to be formed of polyimide.

INDUSTRIAL APPLICABILITY

According to the present invention, a pressure sensor having at a front end of an optical fiber a circular reflective type diaphragm unit the diameter of which is not larger than that of the optical fiber, and capable of being used in an organism, such as a blood vessel and the like and a capillary can be obtained. The manufacturing method according to the invention is capable of solving the problems of an optical fiber type pressure sensor of related art which include a low yield of manufacturing a pressure senser portion and a low yield of connecting the pressure sensor and an optical fiber together, and obtaining a pressure sensor, which has the above-mentioned characteristics, at a high yield and high manufacturing efficiency.

What is claimed is:

1. A pressure sensor, comprising: a reflective movable diaphragm unit comprising diaphragm portions formed by a circular $SiO_2$ film, a mesa portion and light-reflecting mirror portion of the $SiO_2$ film disposed in the center, and a ring-shaped spacer and bonding layer comprising metal layers in the circumferential edge portion of the diaphragm portion; and an optical fiber with a half-mirror layer at the tip with a diameter under 125 $\mu$m, and a bonding layer comprising metal layers, wherein the reflective movable diaphragm unit is attached to the tip of the optical fiber.

2. A pressure sensor according to claim 1, further comprising a vacuum-sealed cavity between the reflective movable diaphragm unit and the optical fiber.

3. A pressure sensor, according to claim 1, wherein the half mirror layer is comprised only of the core area of the end surface of the optical fiber.

4. A pressure sensor, according to claim 2, wherein the mesa portion is set within the cavity.

5. A pressure sensor, according to claim 1, wherein a diameter of the diaphragm portion does not exceed the diameter of the optical fiber.

6. A pressure sensor according to claim 1 wherein the spacer comprises Ni, the diaphragm unit bonding layer comprises Sn, and the optical fiber bonding layer comprises Cr, Cu, and Au layers in that order from the optical fiber side.

7. A pressure sensor, comprising: a reflective movable diaphragm unit comprising diaphragm portions formed by a circular SiO$_2$ film, a mesa portion and light-reflecting mirror portion of the SiO$_2$ film disposed in the center, and a ring-shaped spacer and bonding layer comprising metal layers in the circumferential edge portion of the diaphragm portion;

a rod lens of a diameter under 125 μm, that consists of a half-mirror layer and a bonding layer at an end surface facing the diaphragm portion; and an optical fiber with a diameter under 125 μm.

8. A pressure sensor according to claim 1, wherein the diaphragm portion has a cross-sectionally substantially semicircular part.

9. A pressure sensor according to claim 7, wherein the diaphragm portion has a cross-sectionally substantially semicircular part.

10. A pressure sensor according to claim 1, wherein the diaphragm portion has a cross-sectionally flat part.

11. A pressure sensor according to claim 7, wherein the diaphragm portion has a cross-sectionally, flat part.

* * * * *